May 22, 1951      C. FEID      2,553,563
BRACELET
Filed March 20, 1947
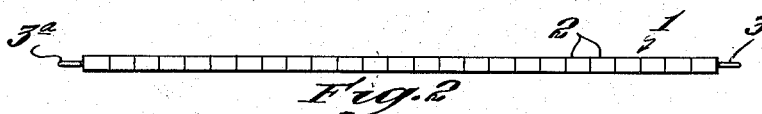
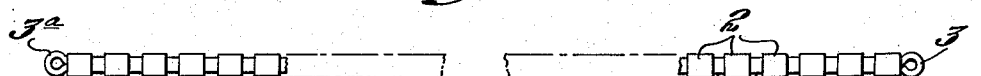
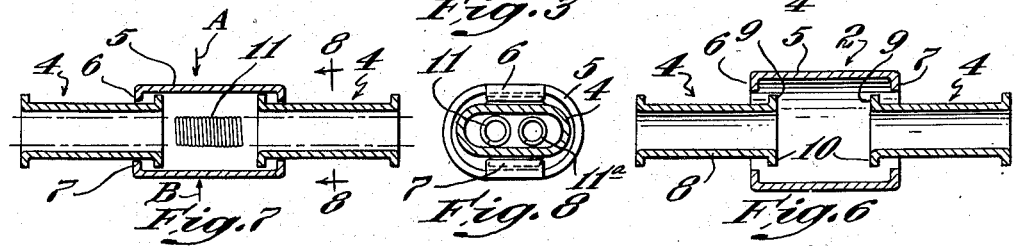
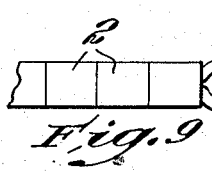
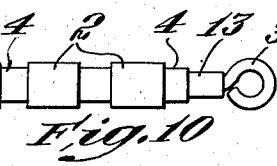
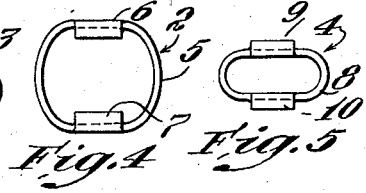
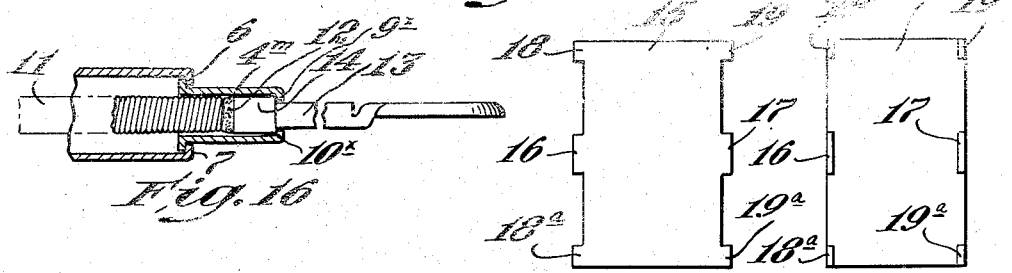
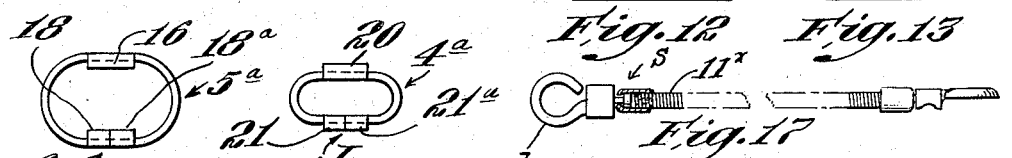
Inventor
Charles Feid
by Roberts Cushman Grover
Att'ys.

Patented May 22, 1951

2,553,563

UNITED STATES PATENT OFFICE 2,553,563

BRACELET

Charles Feid, South Attleboro, Mass., assignor to Bugbee and Niles Company, North Attleboro, Mass., a corporation of Massachusetts Application March 20, 1947, Serial No. 736,003

1 Claim. (Cl. 63—5)

This invention pertains to expansible bracelets, in particular to wrist-watch bracelets of that kind wherein a series of hollow bead-like elements or links are so connected as to be capable of limited relative movement away from each other and are constantly urged toward each other by a spring. Heretofore it has been proposed to unite the beads or links of such a bracelet by means of hollow spool-shaped connectors, but the assembly of the beads and connectors by previous methods has been slow, troublesome and expensive. Moreover, as heretofore made, the single helical spring employed for contracting the bracelet tends to twist and cause the bracelet to writhe, thus detracting from its desired ornamental appearance and even causing discomfort to the wearer. One object of the present invention is to provide a bracelet of the above type comprising beads and connectors so designed as to facilitate the assembly of the parts. A further object is to provide a novel constricting device which is substantially neutral as respects tendency to twist, thereby maintaining the bracelet in plain, circular form. A further object is to provide a bracelet which is capable of a high degree of expansion, for example, a bracelet of a normal length of five and one-quarter inches may be stretched to a length of eight and three-quarter inches. A further object is to provide an expansible wristwatch bracelet, having terminal loops or eyes for connection to the watch and comprising externally smooth telescopic individually rigid links which provides great strength and which is comfortable to the wearer and of pleasing appearance. A further object is to provide a novel method of making such bracelets. Other and further objects and advantages of the invention will be pointed out in the following more detailed description and by reference to the accompanying drawings wherein:

Fig. 1 is a plan view of a bracelet embodying the present invention open and with its parts disposed in a straight line;

Fig. 2 is an edge elevation of the bracelet as shown in Fig. 1;

Fig. 3 is a view similar to Fig. 1 but showing the bracelet extended;

Fig. 4 is an end elevation of one of the beads or links of the bracelet before the assembly with the other parts;

Fig. 5 is a similar end elevation of one of the connectors used for uniting the beads;

Fig. 6 is a longitudinal section showing a bead, such as that of Fig. 4 (but to larger scale), and two connectors such as shown in Fig. 5, assembled in readiness for the operation of permanently uniting them;

Fig. 7 is a view similar to Fig. 6 but showing the parts after the bead has been compressed so as permanently to unite the bead and connectors, a portion of the constrictive unit also being shown;

Fig. 8 is a transverse section substantially on the line 8—8 of Fig. 7;

Fig. 9 is a fragmentary plan view, to larger scale than Fig. 1, showing one end of the bracelet as it appears when fully contracted;

Fig. 10 is a view similar to Fig. 9, but showing the bracelet as it appears when fully extended;

Fig 11 is a plan view of a constricting device of a preferred construction;

Fig. 12 is a plan view, to large scale, of a blank for use in making a bead of a modified construction;

Fig. 13 is a plan view of the same blank after having its marginal tabs turned upwardly perpendicular to the plane of the blank;

Fig. 14 is an end view of a bead formed from the blank of Fig. 12;

Fig. 15 is an end view of a connector made in accordance with a procedure similar to that used in making the bead of Fig. 14;

Fig. 16 is a fragmentary vertical section, to large scale, illustrating a preferred way of securing a terminal loop to the contractile unit of the bracelet;

Fig. 17 is a fragmentary plan view of a contractile unit of modified construction; and Fig. 18 is a fragmentary section illustrating a desirable way of attaching a terminal loop to the spring member of the contractile unit.

Referring to the drawings, the numeral 1 designates the completed bracelet in its contracted condition with its constituent beads 2 substantially in contact and with the terminal loops 3 and 3a contacting the end beads. In Fig. 3 the bracelet is shown as extended, the connectors 4 being exposed and alternating with the beads 2.

In accordance with one construction, the beads are tubular and seamless. Thus they may be made from lengths of a piece of seamless metal tubing. This tubing may be of circular transverse section, but preferably it is of a generally elliptical transverse section, as illustrated, for example, in Fig. 4. Each end of each bead is provided with an inwardly directed retaining lip 6 and 7 respectively, these lips being diametrically opposite and projecting from the longer sides of the bead. Thus, if the bead be of elliptical contour, the lips 6 and 7 will be symmetrically disposed with relation to the minor axis of the ellipse. These lips 6 and 7 are segmental, that is to say they extend along only a portion of the periphery of the tubular bead. For example they may subtend an arc of the order of 60° at the center of the tube.

The connectors 4 are likewise formed from lengths of seamless metal tubing and are preferably of a transverse sectional contour, generally similar to that of the beads. The longer external dimension of the connector is such that the connector may telescope into the bead with the major axes of the connectors and beads coinciding and with some slight clearance between the connectors and the walls of the beads. The shorter dimension of the connector is substantially less than that of the bead so as to leave a substantial space between the surface of the longer wall of the connector and the inner surface of the longer wall of the bead. The connector is furnished at each end with outwardly projecting segmental retaining lips 9 and 10 respectively. In the completed bracelet the lips 9 and 10 are disposed at the inner sides of the lips 6 and 7 of the bead, the lips of the bead and connector then overlapping so that the connector cannot be withdrawn from the bead. Preferably, the lips 9 and 10 do not contact the inner surfaces of the bead nor do the lips 6 and 7 contact the outer surfaces of the connectors so that there is some freedom of motion between the beads and connectors.

Before assembly, the difference in the shorter dimensions of the connectors and beads is greater than in the finished bracelet. The shorter dimension of the bead is such, before assembly of the parts, as to permit the lips 9 and 10 of the connector to pass between the opposed edges of the lips 6 and 7 of the bead. After having assembled the bead with a pair of adjacent connectors, (Fig. 6) by thus pushing the ends of the connectors through the space between the lips 6 and 7 of the bead, pressure is applied in the direction indicated by the arrows A and B (Fig. 7), so as to decrease the shorter dimension of the bead sufficiently to cause its lips 6 and 7 to overlap the lips 9 and 10 of the connector. The connectors are thus permanently attached to the beads, the parts occupying the relative positions indicated in Figs. 7 and 8, after completion. While the beads and connectors are free to move longitudinally to a limited extent, and also to be swung out of exact axial alignment, the connectors constitute positive and permanent means for uniting adjacent beads. The lengths of the connectors 4 is preferably such that when the bracelet is fully contracted, the beads 2 actually contact each other (Figs. 1 and 9) so that the connectors are concealed from view.

The beads and connectors, after being assembled and united, as above described, to form a series of desired length, with beads and connectors alternating, is strung upon a flexible and resilient contractile unit, preferably comprising one or more helical coiled springs. Preferably two such springs 11 and 11ª (Figs. 8 and 11) are employed in making this contractile unit, the coils of the two springs being of opposite pitch thereby neutralizing any tendency of the contractile unit to twist. While in its broader aspects the invention contemplates the stringing of the beads and connectors upon a single helical coiled spring or upon any other suitable elastically contractile flexible element, for example a rubber band or rubber-elastic cord, the construction here illustrated is considered desirable in view of its permanence and resistance to the effects of moisture and heat.

As illustrated in Fig. 16, the ends of the parallel coiled springs 11 and 11ª are united by solder or brazing (shown at 12) to the end of a terminal bar 13 which passes through the endmost connector 4ᵐ of the series and extends outwardly beyond the outer end of the connector and is provided at its outer extremity with a connecting element, for example the loop 3, made by bending the material of the bar 13. Preferably the bar 13 is provided with a stop element 14, for instance an enlargement or head, located adjacent to the solder connection 12. The end connector 4ᵐ is not only provided with the usual outstanding lips 9 and 10 at its inner end but is provided with inwardly directed lips 9ˣ and 10ˣ at its outer end. These lips 9ˣ and 10ˣ are designed to be engaged by the edge of the shoulder at the junction of the enlargement 14 with rod 13 thereby forming a limiting stop to determine the maximum extension of the bracelet.

If a single spring be employed, some other means than a second oppositely wound spring may be employed for neutralizing the twisting tendency of the single spring. Thus, as shown in Fig. 17, the single coiled spring 11ˣ is connected by a swivel S to the terminal loop 3 at each end of the contractile unit, so that twist of the spring is not communicated to the terminal loops.

In assembling the parts, the rod 13, already soldered to the contractile unit, is passed between the lips 9ˣ and 10ˣ (before the end connector 4ᵐ is assembled with the endmost bead) and the end of the terminal bar 13 is then bent to form the loop 4. The lips 9 and 10 of the endmost connector 4ᵐ are then introduced into the end of the bead and the latter is compressed, as above described, so that its lips 6 and 7 overlie the lips 9 and 10 of the endmost connector 4ᵐ. The same operation at the other end completes the assembly of the bracelet.

In accordance with a modified and preferred procedure, instead of using seamless tubing in forming the beads and connectors, blanks 15 of sheet metal such as illustrated in Figs. 12 and 13 may be employed. The blank illustrated is that which is used in forming the bead. This blank is an elongate, substantially rectangular piece having lugs or ears 16 and 17 projecting outwardly from its longer edges at its mid-portion and having outwardly projecting lips or lugs 18 and 19, and 18ª and 19ª at its opposite ends. The lugs or lips 18 and 19 and 18ª and 19ª are each of a length (longitudinally of the blank) approximately half the length of the lugs 15 and 16.

The first operation after forming the blank is to turn the several lips or lugs up perpendicular to the edge of the blank, as shown in Fig. 13. A similar blank, but of smaller dimensions appropriate to form a connector, is then prepared, and this latter blank is placed in a suitable die which curls it around, as shown in Fig. 15, to a more or less elliptical contour, bringing the ends of the blank into contact and disposing its long lips or lugs 20 so that they project inwardly from the long edge of the ellipse and so that its short lugs 21 and 21ª, for example, are juxtaposed and project outwardly from the opposite long side of the ellipse. The abutting edges of the blank may now be united by solder or brazing, thus producing a connector corresponding in general to that of Fig. 4, as made from the seamless tubing. The connector blank of Fig. 13 is now curled around the connector of Fig. 15 by the use of a suitable die or other appropriate means, being brought to its final dimensions in a single operation such that its inwardly directed segmental lips overlap the outwardly projecting segmental lugs of the connector after which its abutting edges are united by solder.

Fig. 18 illustrates another way of connecting the springs of the contractile unit to a terminal link. The terminal link 30 is a closed loop of wire having a substantially straight, elongate side 31 constituting a pivot which is embraced by a circular end loop on each of the springs 11 and 11ª. A connector 4ᵇ of sheet metal (similar to the above connectors 4) houses the end portions of the springs and has an integral tab 33 which is bent to embrace the spring loops 32 and the pivot 31. The connector 4ᵇ also has oppositely directed external lugs 20ˣ and 21ˣ which function like the lugs 20 and 21 of the connectors 4. The connector 4ᵇ thus provides a direct, inextensible and positive connection between the terminal link 30 and the bracelet proper.

While certain desirable embodiments of the invention have been illustrated and described by way of example, it is to be understood that the invention is broadly inclusive of any and all modifications falling within the scope of the appended claim.

I claim:

An expansible bracelet comprising a series of tubular beads, tubular connectors, and a flexible contractile unit upon which the beads and connectors are strung, said contractile unit comprising two parallel helical coiled springs of opposite pitch respectively, each spring having a substantially circular integral loop at each end, and closed terminal links each having an elongate pivot portion which is embraced by the loops at one end of each of the springs respectively, each endmost connector having an integral tab bent to embrace the pivot portion of the corresponding terminal link and which thereby positively attaches the endmost connector to the corresponding terminal link.

CHARLES FEID.

REFERENCES CITED

The following references are of record in the file of this patent:

UNITED STATES PATENTS

| Number | Name | Date |
| --- | --- | --- |
| 391,883 | Cottle | Oct. 30, 1888 |
| 1,250,153 | Ellis | Dec. 18, 1917 |
| 1,515,499 | Lederer | Nov. 11, 1924 |
| 1,550,024 | Garst et al. | Aug. 18, 1925 |
| 1,916,821 | Bigney | July 4, 1933 |
| 1,947,113 | Russell | Feb. 13, 1934 |
| 2,079,386 | Shofer | May 14, 1937 |

FOREIGN PATENTS

| Number | Country | Date |
| --- | --- | --- |
| 11,070 | Great Britain | June 19, 1900 |